(12) United States Patent
Hümmeler et al.

(10) Patent No.: US 11,822,310 B2
(45) Date of Patent: Nov. 21, 2023

(54) INCREASE IN SURFACE QUALITY

(71) Applicant: EOS GmbH Electro Optical Systems, Krailling (DE)

(72) Inventors: Ludger Hümmeler, Gauting (DE); Christopher Schmitt, Munich (DE)

(73) Assignee: EOS GmbH Electro Optical Systems, Krailling (DE)

( * ) Notice: Subject to any disclaimer, the term of this patent is extended or adjusted under 35 U.S.C. 154(b) by 636 days.

(21) Appl. No.: 16/607,633

(22) PCT Filed: Apr. 24, 2018

(86) PCT No.: PCT/EP2018/060494
§ 371 (c)(1),
(2) Date: Oct. 23, 2019

(87) PCT Pub. No.: WO2018/197506
PCT Pub. Date: Nov. 1, 2018

(65) Prior Publication Data
US 2021/0283851 A1 Sep. 16, 2021

(30) Foreign Application Priority Data
Apr. 28, 2017 (DE) .......................... 102017207256.3

(51) Int. Cl.
G05B 19/4099 (2006.01)
B33Y 10/00 (2015.01)
(Continued)

(52) U.S. Cl.
CPC .......... *G05B 19/4099* (2013.01); *B22F 10/28* (2021.01); *B22F 10/322* (2021.01);
(Continued)

(58) Field of Classification Search
CPC ... B29C 64/393; B29C 64/153; B29C 64/268; B29C 64/371; B22F 10/85; B22F 12/41;
(Continued)

(56) References Cited

U.S. PATENT DOCUMENTS

2014/0332507 A1* 11/2014 Fockele ................. B22F 10/20
219/121.61
2016/0279706 A1 9/2016 Domrose et al.
(Continued)

FOREIGN PATENT DOCUMENTS

DE 10208150 12/2009
DE 102013205724 10/2014
(Continued)

OTHER PUBLICATIONS

International Search Report for Application No. PCT/EP2018/060494, dated Jul. 25, 2018, 3 pages.
(Continued)

*Primary Examiner* — Monica A Huson
*Assistant Examiner* — Kelsey C Grace
(74) *Attorney, Agent, or Firm* — Polsinelli PC

(57) ABSTRACT

A method for providing control data for a generative layer construction device includes accessing layer data records that have data models of buildup material layers to be selectively solidified, where a base surface region of an object cross section exists in at least one layer data record, where in at least one of p layers below the base surface region, no solidification of buildup material is specified. The method further includes changing the layer data record such that a temporal sequence for scanning the associated object cross section with energy radiation is specified such that at least one portion of the base surface region is scanned before all other parts of the object cross section; and a third step,
(Continued)

where the changed layer data record is provided for the generation of a control data record for the device.

16 Claims, 10 Drawing Sheets

(51) Int. Cl.

| | | |
|---|---|---|
| *B33Y 30/00* | (2015.01) | |
| *B33Y 40/00* | (2020.01) | |
| *B33Y 50/02* | (2015.01) | |
| *B29C 64/153* | (2017.01) | |
| *B29C 64/393* | (2017.01) | |
| *B29C 64/268* | (2017.01) | |
| *B29C 64/371* | (2017.01) | |
| *B22F 10/85* | (2021.01) | |
| *B22F 12/41* | (2021.01) | |
| *B22F 12/70* | (2021.01) | |
| *B22F 10/28* | (2021.01) | |
| *B28B 1/00* | (2006.01) | |
| *B28B 17/00* | (2006.01) | |
| *B22F 12/90* | (2021.01) | |
| *B22F 10/322* | (2021.01) | |
| *B22F 10/366* | (2021.01) | |
| *B22F 10/38* | (2021.01) | |
| *B22F 10/80* | (2021.01) | |

(52) U.S. Cl.
CPC ............ *B22F 10/366* (2021.01); *B22F 10/38* (2021.01); *B22F 10/80* (2021.01); *B22F 10/85* (2021.01); *B22F 12/41* (2021.01); *B22F 12/70* (2021.01); *B22F 12/90* (2021.01); *B28B 1/001* (2013.01); *B28B 17/0081* (2013.01); *B29C 64/153* (2017.08); *B29C 64/268* (2017.08); *B29C 64/371* (2017.08); *B29C 64/393* (2017.08); *B33Y 10/00* (2014.12); *B33Y 30/00* (2014.12); *B33Y 40/00* (2014.12); *B33Y 50/02* (2014.12)

(58) Field of Classification Search
CPC .......... B22F 12/70; B22F 10/28; B28B 1/001; B28B 17/0081
See application file for complete search history.

(56) References Cited

U.S. PATENT DOCUMENTS

| | | |
|---|---|---|
| 2017/0282463 A1 | 10/2017 | Schilling et al. |
| 2018/0050423 A1 | 2/2018 | Hoferer |

FOREIGN PATENT DOCUMENTS

| | | |
|---|---|---|
| DE | 102014217786 | 3/2016 |
| DE | 102014226839 | 6/2016 |
| DE | 102015204630 | 9/2016 |
| EP | 3127635 | 2/2017 |
| WO | 2007147221 | 12/2007 |
| WO | 2013079581 | 6/2013 |

OTHER PUBLICATIONS

Harald Krauss: Qualitätssicherung beim Laserstrahlschmelzen durch schichtweise thermographische In-Process-Überwachung, Herbert Utz Verlag München, Forschungsberichte IWB, Band 325, Herbert Utz Verlag GmbH 2016, ISBN 978-3-8316-4628-9, URL: https://www.iwb.mw.tum.de (German), 290 pages.

H. Krauss, M. F. Zaeh: Investigations on manufacturability and process reliability of selective laser melting. In. Physics Procedia, vol. 41, 2013, p. 815-822.—ISSN 1875-3892 (English), 8 pages.

\* cited by examiner

Fig. 5
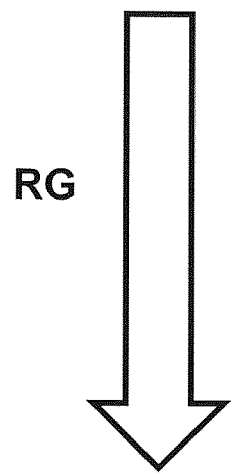
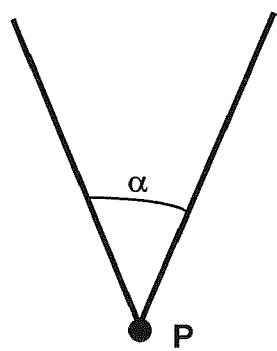

Fig. 10      a)                                b)
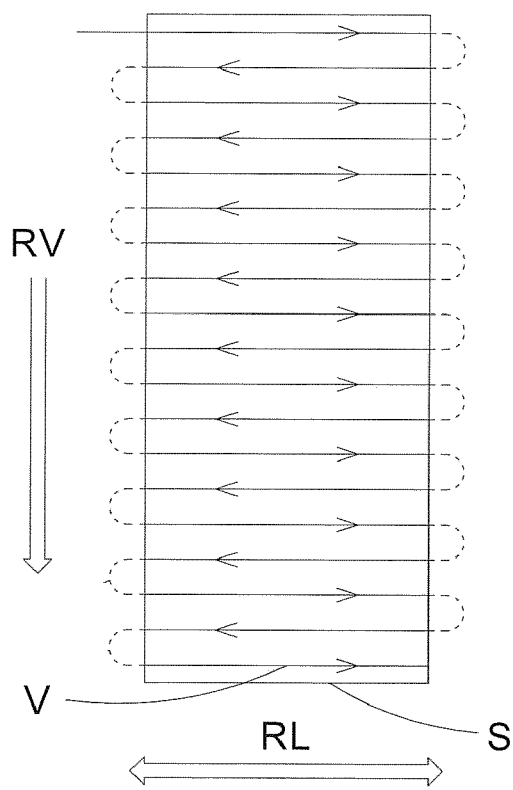
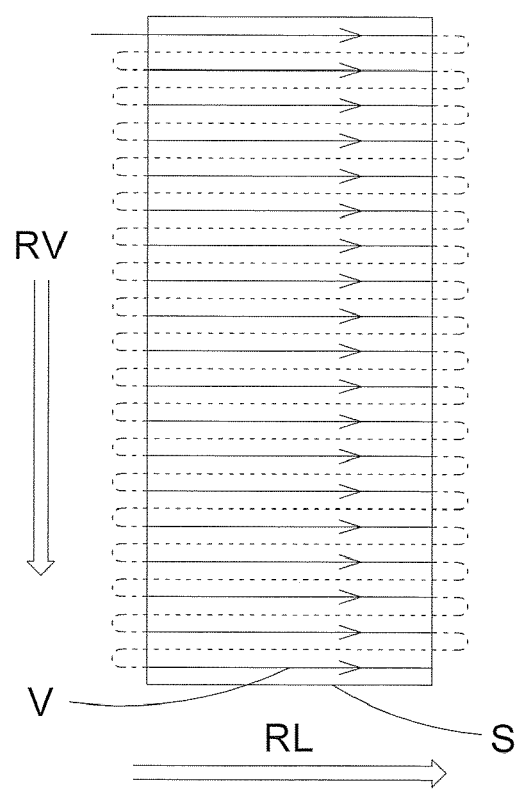

INCREASE IN SURFACE QUALITY

TECHNICAL FIELD OF THE INVENTION

The invention refers to a method and a device of providing control data for a layer-wise additive manufacturing apparatus, a respectively adapted layer-wise additive manufacturing method, a respectively adapted layer-wise additive manufacturing apparatus and a respectively adapted computer program.

BACKGROUND OF THE INVENTION

Layer-wise additive manufacturing apparatus and corresponding methods are generally characterized in that objects are manufactured in them layer by layer by means of a solidification of a shapeless building material. For example, the solidification can be effected by means of a supply of heat energy to the building material by irradiating the same with electromagnetic radiation or particle radiation (e.g. laser sintering (SLS or DMLS) or laser melting or electron beam melting) or else by effecting a cross-linking reaction in the building material (e.g. stereolithography).

In particular in layer-wise additive manufacturing methods in which for a solidification heat energy is supplied to the building material, there is the problem that the heat conductivity of the surrounding of the positions of incidence of the radiation may vary within an object cross-section so that temperature differences in a solidified layer and as a result thereof stress in the solidified material occurs leading to a deteriorated object quality. In order to achieve a high quality of objects manufactured by laser melting methods, WO 2013/079581 A1 therefore suggests making the energy input dependent on the heat conducting properties of the surrounding of a position of incidence of the radiation. For this, the surrounding of a position of incidence of the radiation is divided into voxels and the number of voxels in which the building material is not solidified is determined as non-solidified building material has a worse heat conductivity compared to melted and solidified, respectively, building material.

Though the method of WO 2013/079581 A1 can potentially lead to a better quality of the surfaces of a manufactured object, the inventors have found that in particular the quality of those object surfaces that are oriented in parallel to the layers during the additive manufacturing of the object (in technical jargon called "upskin regions and downskin regions") should be further improved.

SUMMARY OF THE INVENTION

Therefore, it is an object of the present invention to provide a method and a device, by which the quality of object surfaces that are oriented in parallel to the layers during the additive manufacturing of an object can be improved.

The object is achieved by means of a computer-based method according to claim 1, a layer-wise additive manufacturing method according to claim 5, a device for providing control data according to claim 12, a layer-wise additive manufacturing apparatus according to claim 14 and a computer program according to claim 15. Further developments of the invention are claimed in the dependent claims. In particular, a method according to the invention can be developed further also by features of the devices according to the invention characterized further below and in the dependent claims, respectively, and vice-versa. Moreover, the features described in connection with one device may also be used for a further development of another device according to the invention, even if this is not explicitly stated.

A computer-based method of providing control data for a layer-wise additive manufacturing apparatus for manufacturing a three-dimensional object,
  wherein in the layer-wise additive manufacturing apparatus the at least one object is manufactured by a layer-wise application of a building material onto a support or a previously applied layer of the building material and by a solidification of the building material by means of a supply of radiation to positions in a layer that correspond to the cross-section of the object in this layer in that these positions are scanned with energetic radiation by means of an energy input unit such that the energy input unit directs at least one energy beam to predetermined positions of a layer of the building material so that a solidification of the building material is effected by the energy beam, comprises a first step of accessing a plurality of layer datasets comprising data models of a plurality of building material layers to be selectively solidified during the manufacture and lying immediately one over the other, wherein each layer dataset comprises a data model in which positions corresponding to an object cross-section are marked, at which positions a solidification of the building material in the respective layer shall occur, and wherein in at least one layer dataset a bottom surface region of an object cross-section exists in the corresponding data model which bottom surface region is defined such that in at least one of p layers below the bottom surface region no solidification of building material is specified, wherein p is a predefined natural number, and/or a top surface region of an object cross-section exists which top surface region is defined such that in at least one of q layers above the top surface region no solidification of building material is specified, wherein q is a predefined natural number,
  wherein in a second step the at least one layer dataset is modified such that a temporal sequence for the scanning of the respective object cross-section with energetic radiation is specified such that at least one portion of the bottom surface region, preferably the whole bottom surface region, or at least one portion of the top surface region, preferably the whole top surface region, is scanned before all other positions to be solidified of said object cross-section, and
  in a third step the at least one layer dataset that has been modified in the second step is provided for the generation of a control dataset for the layer-wise additive manufacturing apparatus.

Layer-wise additive manufacturing apparatus and methods to which the present invention refers are in particular those in which energy is selectively applied as electromagnetic radiation or particle radiation on a layer of the building material. Here, the energy input unit may for example comprise a laser or an electron beam source. However, also a UV light source is conceivable, which is used in stereolithography in particular. While in stereolithography a solidification of the building material is effected in that the radiation acting on the building material causes a cross-linking reaction in the same, in other methods, in particular in laser sintering or laser melting and electron beam melting, respectively, heat is supplied to the building material. Here, the building material is partially or completely melted by means of the energy input by the radiation, so that the constituents of the building material (for example powder grains) coalesce. Then, after its cooling-down the building material exists in a solid state. As the transitions between superficial melting (sintering) and complete melting (melting) are smooth, the terms "sintering" and "melting" are synonymously used in the present application and no difference is made between sintering and melting.

If in this application layers are mentioned that are below or above of an object cross-section, this indication of a direction refers to a direction which is substantially perpendicular to the layer planes and perpendicular to the construction plane, respectively. The term "substantially" here expresses the fact that in some cases the layer thickness may not be uniform, e.g. the layer thickness may monotonically change across the object cross-section. In this respect it is assumed that below-lying layers were applied earlier in time than above-lying layers and therefore are located below the above-lying layers.

The term "beam" shall express the fact that not only rays are comprised which have a circular cross-section when impinging on the building material but also rays, which e.g. have a line-shaped cross-section or even radiation that is simultaneously input into a larger area of the building material (thus aerially). For example, also large area regions irradiated in mask sintering methods are regarded as beams in the sense of the present invention. Furthermore, it does not play any role for the present invention, whether the energy input unit is able to direct one or several energy beams subsequently or simultaneously to the building material as long as the temporal sequence specified in the second step is observed.

Here, it shall be remarked that by means of an inventive layer-wise additive manufacturing apparatus not only one object but also a plurality of objects can be simultaneously manufactured. If anywhere in the present application the manufacturing of an object is mentioned, it is self-evident that the corresponding description is in the same way applicable also to layer-wise additive manufacturing methods and apparatus, in which several objects are manufactured at the same time.

Here, a control dataset (often also termed "control command set") is regarded to be a sequence of instructions to subsequently apply layers of the building material and to scan regions of the respective layers that correspond to the cross-section of an object to be manufactured with energy radiation in order to solidify the building material.

In detail, a control dataset is based on a computer-based model of the object(s) to be manufactured, preferably a CAD model. The control dataset specifies for each building material layer during the manufacture in particular the thickness of the layer application and the positions at which a solidification of the building material shall be effected by a supply of radiation. Furthermore, a control dataset often also includes manufacturing-specific information, for example with respect to the position and orientation of the objects in the layer-wise additive manufacturing apparatus or with respect to a diameter of the energy beam when impinging on the building material. Usually, the control dataset contains all data that are necessary for a control of the energy input device, whereby a.o. the energy density of the energy radiation and, if applicable, the velocity of movement of the beam across the building material and/or an irradiation pattern are determined.

Thus, the control dataset can be regarded as entirety of all control data that are specified for the control of the manufacturing process in a layer-wise additive manufacturing apparatus. In the following, the control data related to a single layer are also referred to as layer dataset.

In the present application a layer dataset is considered to be a dataset that contains a data model of a building material layer that is to be solidified during the manufacturing process at the positions of an object cross-section. Such a layer dataset usually is obtained by dividing a CAD model of the object to be manufactured into layers (in technical jargon named "slicing"). However, it is also conceivable to extract a two-dimensional representation of the object cross-section, which is to be solidified in a layer by means of one or more beams, from the computer-based CAD model of the object in a different way. Further information with regard to the manufacturing of the object cross-section may be, but need not be, included in the layer dataset, e.g. the layer thickness or exposure parameter values such as the diameter of a beam impinging on the building material, etc.

If an access to a plurality of layer datasets is mentioned, this means that layer datasets are read from a memory or else that the data corresponding to the layer datasets are received via a network. Here, the layer datasets need not necessarily be read together (meaning at the same time). It is also possible that there is a larger time-lag between the events at which the layer datasets are accessed, for example if a layer dataset in each case is read when needed during a manufacturing process of an object and a modified layer dataset then is integrated into the control dataset during the manufacturing method.

The provision of the layer dataset modified in the second step for the generation of a control dataset can e.g. also be done by the layer dataset provision unit 103 in that the same integrates the modified layer dataset into a control dataset for the layer-wise additive manufacturing apparatus. However, a provision also includes a transfer of the layer dataset to a data processing device that integrates the layer dataset into a control dataset or a direct transfer to a layer-wise additive manufacturing apparatus. In particular, it is possible to dynamically provide control data for object cross-sections still to be manufactured to a layer-wise additive manufacturing apparatus during a manufacturing process in the same. In particular, layer datasets that have been modified according to the invention need not be provided individually for a layer-wise additive manufacturing process. Rather, also several modified layer datasets may at first be collected and then be provided in their entirety for an integration into a control dataset.

During the manufacturing process in a layer-wise additive manufacturing apparatus, in particular when the energetic radiation inputs heat energy into the building material, evaporating fumes and smoke generation can occur when the energy radiation impinges on the building material. Process turbulences may lead to spillings of material that at first is liquid, which spillings are emanating from the position of incidence of the energy radiation on the building material and are in general referred to as splashes.

The inventors have made the experience that in an object cross-section to be solidified an adjustment of the energy input in order to achieve a good surface quality is particularly difficult in bottom surface regions and top surface regions as these regions adjoin material that remains unsolidified perpendicularly to the building material layer. In particular, the inventors could observe that depositions on non-solidified building material and vapors and smoke, respectively, in the beam path of an energy beam can lead to an uneven rough surface and to temperature inhomogeneities and thus e.g. to an imperfect melting and solidifying, respectively, and to an inhomogeneous density, respectively.

If splashes reach unsolidified material, there is an increased occurrence of the described inhomogeneities. Under these circumstances, it is particularly difficult to supply in each case the locally appropriate amount of energy for a solidification of the building material in bottom surface regions and top surface regions. However, by the described approach a limitation of the disadvantageous effects of splashes, vapors and smoke can be achieved, because a portion of a bottom surface region or top surface region is scanned with energy radiation earlier in time, so that splashes, vapors and smoke caused by the solidification of the rest of the object cross-section do not affect the solidification of the portion of a bottom surface region or top surface region.

Of course, preferably the entire bottom surface region or top surface region should be scanned with energetic radiation earlier in time, however, in certain cases it may also be sufficient if only one or more specific portions of the bottom surface region or top surface region are scanned earlier in time as long as e.g. these portions are more important for the object quality than the rest of the bottom surface region and top surface region, respectively.

It shall be mentioned that usually also contour regions of an object cross-section exist, in particular the contour of an object cross-section that normally is solidified by moving a beam along the edge of an object cross-section. Though these contour regions of an object cross-section can also be a part of a bottom surface region, a top surface region or a sandwich region, the present invention only refers to non-contour regions. This means, the portion of the bottom surface region or top surface region that is scanned with temporal priority may contain a contour region. However, the case in which the portion exclusively contains contour regions is excluded. Preferably, the portion of the bottom surface region or top surface region that is scanned with temporal priority only comprises non-contour regions. Also, all further positions of the object cross-section that are to be solidified, before which positions at least a portion of the bottom surface region or top surface region is scanned, preferably are non-contour regions.

Preferably, the portion of the bottom surface region or top surface region that is scanned with energetic radiation with temporal priority comprises at least 60%, more preferably at least 80%, particularly preferably at least 90% of the respective area of the bottom surface region and top surface region, respectively, of the corresponding object cross-section in each case. Thus, for example a portion of the bottom surface region or top surface region, which is sufficient for improving the object quality, is scanned with energy radiation with temporal priority.

In a further development of the invention, exposure areas are assigned to the at least one portion of the bottom surface region, preferably the whole bottom surface region, and/or to the at least one portion of the top surface region, preferably the whole top surface region, wherein in each exposure area a scanning of the building material with at least one energy beam in scanlines that preferably are in parallel to each other is specified.

Preferably, the exposure areas have the same size and/or shape (in particular a rectangular or quadratic shape). Here, a scanline is considered to be the path of a beam when it moves across the building material in order to input energy. Within the exposure areas, the building material can be scanned e.g. by moving one or more beams in straight scanlines that are substantially in parallel to each other (in technical jargon named "hatching"), wherein this technique may be embedded in exposure strategies such as a chess or stripe pattern. Additionally or alternatively, the beam(s) can be moved also on scanlines that are in parallel to the contour of the exposure area (in technical jargon named "onion-ring hatching"). The assignment of exposure areas to bottom surface regions or top surface regions also leads to an improvement of the surface quality.

In another further development of the invention, in case a dimension of a portion across which an energy beam is to be moved is so small and/or a velocity of movement of an energy beam across the building material is so large that in the scanning along a first scanline a predetermined minimum length of time is underrun, a waiting time after the scanning of the first scanline is specified before the energy beam is moved along a second scanline and/or a radiation energy input per unit area along the first scanline and/or the second scanline is lowered. By such an approach, the energy input into a portion of a bottom surface region or top surface region can be made more homogeneous even if such a portion in one direction has only a small dimension.

In another further development of the invention, a value smaller than 25, preferably smaller than 10, more preferably smaller than 5, is specified for p and/or q. Within the scope of the invention not necessarily only those regions of an object cross-section that adjoin unsolidified building material in the immediately above or immediately below layer are considered to be bottom surface region or top surface regions. Though the inventors could observe a considerable improvement of the surface quality for $p=1$ and $q=1$, the inventors have also found that an influence on the solidification behavior also exists when there is unsolidified building material the next but one layer or an even more distant layer. Values for the parameters p and q, which values predefine when there is still an influence of unsolidified building material, can be determined depending on experience with a specific building material and a specific layer-wise additive manufacturing apparatus, e.g. after pre-tests.

In an inventive layer-wise additive manufacturing method for manufacturing a three-dimensional object, wherein the object is manufactured by a layer-wise application of a building material onto a support or a previously applied layer of the building material and by a solidification of the building material by means of a supply of radiation to positions in a layer that correspond to the cross-section of the object in this layer in that these positions are scanned with energetic radiation by means of an energy input unit such that the energy input unit directs at least one energy beam to predetermined positions of a layer of the building material so that a solidification of the building material is effected by the energy beam, wherein the process of the layer-wise additive manufacturing method is controlled by a control dataset that has been generated based on at least one layer dataset that was provided by an inventive method of providing control data. Objects having an improved quality of the bottom surface region or top surface region can thereby be manufactured.

In a further development of the inventive layer-wise additive manufacturing method, a gas flow is directed over the respective position of incidence of an energy beam and the process of the layer-wise additive manufacturing method is controlled by a control dataset, in which it is specified that in a layer the object cross-section has positions outside of the bottom surface region that are located further upstream than positions in the at least one portion of the bottom surface region and/or that in a layer the object cross-section has positions outside of the top surface region that are located further upstream than positions in the at least one portion of the top surface region. Typically, an inert gas flow, e.g. argon or nitrogen, is directed at least over regions of a construction field of the layer-wise additive manufacturing apparatus. Often, the gas stream flows in a lower half of a process chamber of a layer-wise additive manufacturing apparatus. It can for example have an extension in height of approximately 10 cm or 30 cm and its boundary lying next to the construction field, i.e. its lower edge may be located in a height of approximately 1 cm or 3 cm above the construction field. Here, such freely flowing gas streams usually are unsteady, i.e. they are subject to certain fluctuations. The gas streams may also comprise several partial gas streams flowing separately to some extent, as the case may be.

If a gas flow is directed over the position of incidence of an energy beam on the building material, smoke and vapors, respectively, which develop due to the incidence of a beam on the building material, can be removed from the position of incidence. Here, smoke and vapors, respectively, substantially move with the gas flow so that they will primarily deposit downstream. Preferably, but not necessarily, there exists a main flow direction of the gas over the building material. In other words, a direction of the gas flow is substantially the same at the different positions of incidence of the radiation on the building material.

In the further development of the inventive layer-wise additive manufacturing method, the portion of the bottom surface region or top surface region that is to be scanned earlier in time than the rest of the object cross-section has positions that are located downstream of the rest of the object cross-section as contaminations (e.g. smoke and vapors, but also splashes) that occur in the solidification of the rest of the object cross-section primarily impair a homogeneous solidification at these positions. Preferably, the portion to be scanned with priority should contain all positions that lie downstream of other positions of the object cross-section.

In another further development of the inventive layer-wise additive manufacturing method, the process of the layer-wise additive manufacturing method is controlled by a control dataset, in which it is specified that in a layer the object cross-section has positions outside of the bottom surface region that are located further upstream within an angular range ($\alpha$) around the direction the gas flow is coming from than positions in the at least one portion of the bottom surface region and/or that in a layer the object cross-section has positions outside of the top surface region (61) that are located further upstream within an angular range ($\alpha$) around the direction the gas flow is coming from than positions in the at least one portion of the top surface region. As the direction of movement of the contaminants in general is not always exactly the same as the direction of the gas flow, in the further development a deviation of the direction of movement from the direction of the gas flow can be taken into consideration in order to further improve the quality. Again, the portion to be scanned with priority should preferably contain all positions for which there exist positions of the object cross-section lying outside of the bottom surface region or top surface region further upstream inside of a predefined angular range around the direction the gas flow is coming from.

Preferably, in the further development a range between $-22.5°$ and $+22.5°$ around the direction the gas flow is coming from, preferably a range between $-90°$ and $+90°$ around the direction the gas flow is coming from, more preferably a range between $-112.5°$ and $+112.5°$ around the direction the gas flow is coming from, is specified as angular range. The inventors have found that depending on the boundary conditions of the manufacturing process the mentioned arranges in general lead to a good quality.

In another further development of the inventive layer-wise additive manufacturing method, the energy input unit is controlled such that the scanning direction, in which the energy beam is moved over the building material at a solidification position and the direction of the gas flow at this position are at an angle ($\gamma$) that is larger than or equal to $22.5°$ and/or smaller than or equal to $337.5°$, preferably larger than or equal to $45°$ and/or smaller than or equal to $315°$, more preferably larger than or equal to $60°$ and/or smaller than or equal to $300°$ and even more preferably larger than or equal to $90°$ and/or smaller than or equal to $270°$. With such a preferred boundary condition for the movement of the beam(s), a deposit of contaminants on the position that in each case is to be solidified next can be avoided. Such an approach does not only make sense in the bottom surface region and top surface region, but also at other positions of an object cross-section.

In a still further development of the inventive layer-wise additive manufacturing method, the process is controlled by a control dataset that has been generated based on at least one layer dataset that was provided by a method, in which exposure areas were assigned to the at least one portion of the bottom surface region, more preferably to the whole bottom surface region, and/or to the at least one portion of the top surface region, more preferably the whole top surface region, wherein in each exposure area a scanning of the building material with at least one energy beam in scanlines that preferably are in parallel to each other was specified.

In this another further development, the energy input unit is controlled such that the scanning directions of two neighbouring scanlines are opposed to each other in at least one exposure region and an advance direction in which the scanlines in this exposure region are subsequently scanned with the at least one energy beam and a direction of the gas flow averaged over all positions of the at least one exposure region are at an angle ($\beta$) that is larger than or equal to $112.5°$ and/or smaller than or equal to $247.5°$, preferably larger than or equal to $135°$ and/or smaller than or equal to $225°$, more preferably larger than or equal to $150°$ and/or smaller than or equal to $210°$.

In this another further development, in particular the direction of the gas flow need not necessarily be the same over all positions of incidence of a beam inside an object cross-section. It is sufficient, if the direction of the gas flow is more or less the same at least over an exposure area. With the described approach it is prevented that contaminations can get into the region of the building material layer that is to be scanned successively in scanlines, wherein in addition the direction in which the scanlines are scanned is taken into consideration. Again, the approach makes sense not only in the bottom surface region and the top surface region, but also at other positions of an object cross-section.

In another further development of the inventive layer-wise additive manufacturing method the process is controlled by a control dataset that was generated based on at least one layer dataset which was provided by a method in which exposure areas were assigned to the at least one portion of the bottom surface region, more preferably the whole bottom surface region and/or the at least one portion of the top surface region, more preferably the whole top surface region, wherein in each exposure area a scanning of the building material with at least one energy beam in scanlines that preferably are in parallel to one another was specified. In another further development, the energy input unit is controlled such that the scanning directions of all scanlines in an exposure region are the same, an advance direction in which the scanlines in this exposure region are subsequently scanned with the at least one energy beam and a direction of the gas flow averaged over all positions of the at least one exposure region are at an angle (β) that is larger than or equal to 22.5° and/or smaller than or equal to 337.5°, preferably larger than or equal to 45° and/or smaller than or equal to 315°, more preferably larger than or equal to 60° and/or smaller than or equal to 300°, and the scanning directions and a direction of the gas flow averaged over all positions of the at least one exposure region are at an angle that is larger than or equal to 90°.

Also in this another further development, the direction of the gas flow need not necessarily be the same over all positions of incidence of a beam. It is sufficient, when the direction of the gas flow is more or less the same at least over an exposure area. By the described approach it is prevented that contaminations may get into the region of the building material layer that is to be scanned successively in scanlines, wherein in addition the direction in which the scanlines are scanned is taken into consideration. Again, the approach makes sense not only in the bottom surface region and the top surface region, but also at other positions of an object cross-section.

An inventive device for providing control data for a layer-wise additive manufacturing apparatus for manufacturing a three-dimensional object,
wherein in the layer-wise additive manufacturing apparatus the at least one object is manufactured by a layer-wise application of a building material onto a support or a previously applied layer of the building material and by a solidification of the building material by means of a supply of radiation to positions in a layer that correspond to the cross-section of the object in this layer in that these positions are scanned with energetic radiation by means of an energy input unit such that the energy input unit directs at least one energy beam to predetermined positions of a layer of the building material so that a solidification of the building material is effected by the energy beam, comprises:
a data access unit configured to access a plurality of layer datasets comprising data models of a plurality of building material layers to be selectively solidified during the manufacture and lying immediately one over the other, wherein each layer dataset comprises a data model in which positions corresponding to an object cross-section are marked, at which positions a solidification of the building material in the respective layer shall occur, and wherein in at least one layer dataset a bottom surface region of an object cross-section exists in the corresponding data model which bottom surface region is defined such that in at least one of p layers below the bottom surface region no solidification of building material is specified, wherein p is a predefined natural number, and/or a top surface region of an object cross-section exists which top surface region is defined such that in at least one of q layers above the top surface region no solidification of building material is specified, wherein q is a predefined natural number,
a layer dataset modification unit that is configured to modify the at least one layer dataset such that a temporal sequence for the scanning of the respective object cross-section with energetic radiation is specified such that at least one portion of the bottom surface region, preferably the whole bottom surface region, or at least one portion of the top surface region, preferably the whole top surface region, is scanned before all other positions to be solidified of said object cross-section, and
a layer dataset provision unit that is configured to provide at least one layer dataset that has been modified by the layer dataset modification unit for the generation of a control dataset for the layer-wise additive manufacturing apparatus.

Preferably, the inventive device is configured to carry out an inventive method of providing control date.

An inventive layer-wise additive manufacturing apparatus for manufacturing a three-dimensional object, wherein the object is manufactured in said layer-wise additive manufacturing apparatus by a layer-wise application of a building material (15) onto a support or a previously applied layer of the building material and by a solidification of the building material by means of a supply of radiation to positions in a layer that correspond to the cross-section of the object in this layer in that these positions are scanned with energetic radiation by means of an energy input unit (20), comprises:
an energy input unit configured to direct at least one energy beam to predetermined positions of a layer of the building material so that a solidification of the building material is effected by the energy beam, and
a gas flow unit configured to direct a gas flow over the position of incidence of the energy beam,
wherein the layer-wise additive manufacturing apparatus is configured to carry out a layer-wise additive manufacturing method.

An inventive computer program comprises program code means to perform all steps of an inventive method of providing control data or an inventive layer-wise additive manufacturing method, when the computer program is executed by a data processor, in particular a data processor interacting with a layer-wise additive manufacturing apparatus. "Interacting" means here that the data processor either is integrated in the layer-wise additive manufacturing apparatus or is able to exchange data with it.

The implementation of the inventive method of generating a control dataset and of the respective device by means of software makes an easy installability on different computing systems at different locations possible (for example at the creator of the design of the object to be processed or else at the operator of the layer-wise additive manufacturing apparatus).

BRIEF DESCRIPTION OF THE DRAWINGS

Further features and practicalities of the invention will arise from the description of embodiments based on the attached drawings.

FIG. 5 schematically illustrates a variant of the approach when there is a gas flow over the construction field.

FIGS. 10*a* and 10*b* schematically illustrate possible approaches when scanning the building material in an exposure area.

DETAILED DESCRIPTION OF THE EMBODIMENTS

Figure 1:
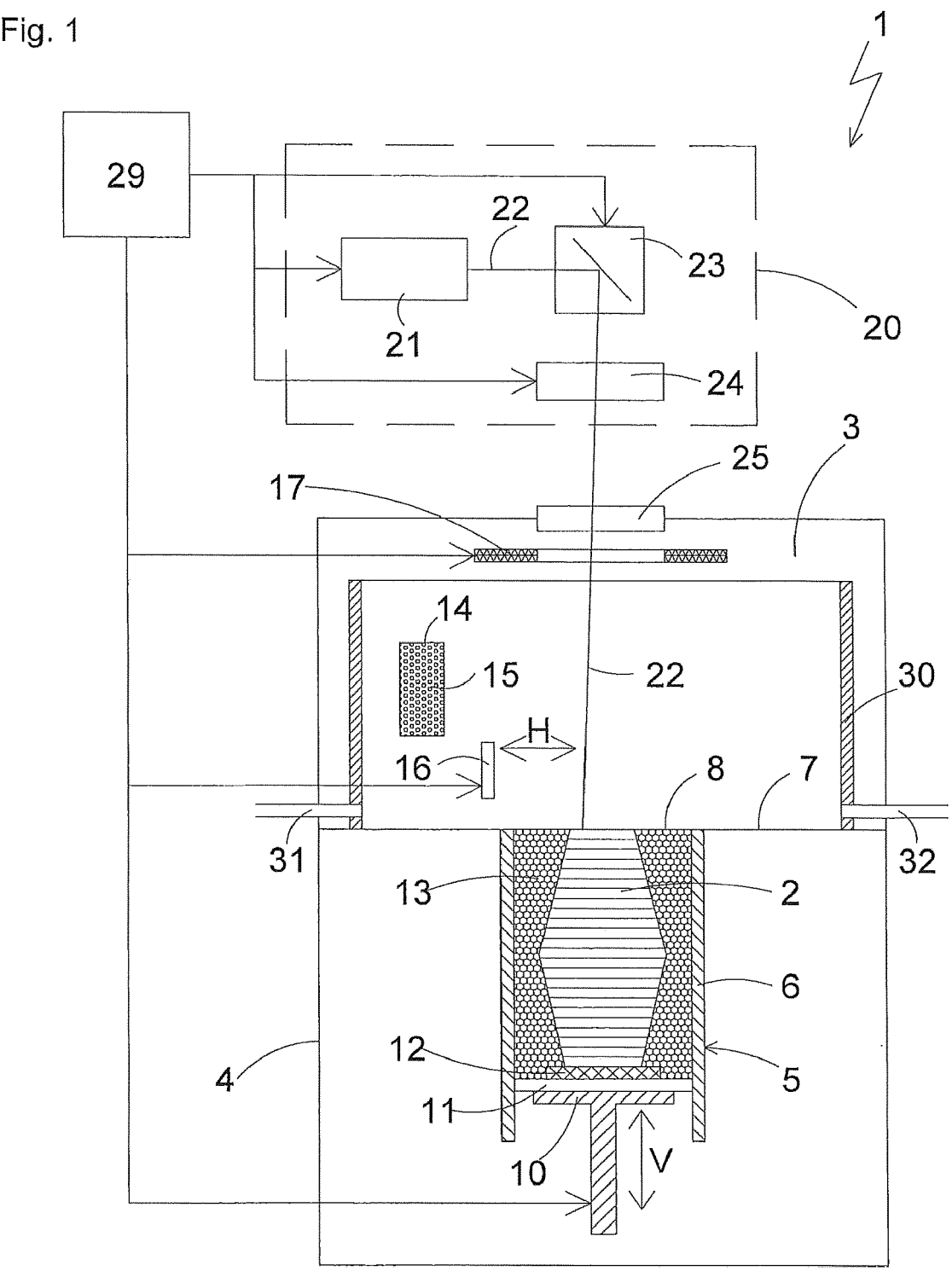
FIG. 1 shows a schematic, partially cross-sectional view of an exemplary device for an additive manufacturing of a three-dimensional object according to an embodiment of the invention.

In the following, for a description of the invention at first a layer-wise additive manufacturing apparatus shall be described at the example of a laser sintering device or laser melting device with reference to FIG. 1. Here, it shall be mentioned that in the present application the term "number" always is to be understood as meaning "one or more".

For building an object 2, the laser sintering or laser melting apparatus comprises a process chamber 3 with a chamber wall 4. A build container 5 open to the top with a container wall 6 is arranged in the process chamber 3. A working plane 7 is defined by the top opening of the container 5, wherein the area of the working plane 7 located within the opening, which area can be used for building the object 2, is referred to as build area 8.

In the build container 5, a support 10 is arranged that can be moved in a vertical direction V and to which a base plate 11 is attached which seals the container 5 at the bottom and thus forms the bottom thereof. The base plate 11 can be formed as a plate separately from the support 10, which plate is fixed to the support 10, or it can be integrally formed with the support 10. Depending on the powder and process used, a building platform 12 as building support can be additionally arranged on the base plate 11, on which building support the object 2 is built. However, the object 2 can also be built on the base plate 11 itself, which then serves as a building support. In FIG. 1, the object 2 to be formed in the container 5 on the building platform 12 is shown below the working plane 7 in an intermediate state with several solidified layers, surrounded by building material 13 that remained unsolidified.

The laser sintering or melting device 1 further comprises a storage container 14 for a building material 15, in this example a powder that can be solidified by electromagnetic radiation, and a recoater 16 that can be moved in a horizontal direction H for applying building material 15 within the build area 8. Optionally, a heating device, e.g. a radiant heater 17, can be arranged in the process chamber 3, which heating device serves for a heating of the applied building material 15. For example, an infrared heater may be provided as radiant heater 17.

The exemplary layer-wise additive manufacturing apparatus 1 further comprises an exposure device 20 having a laser 21 generating a laser beam 22 that is deflected by a deflection device 23 and focused by a focusing device 24 on the working plane 7 through a coupling window 25 that is arranged at the top side of the process chamber 3 in the chamber wall 4.

Furthermore, the exemplary layer-wise additive manufacturing apparatus 1 comprises a control unit 29 by which the individual components of the device 1 can be controlled in a coordinated manner in order to implement the building process. Alternatively, the control unit can also be arranged partially or completely outside of the device. The control unit can comprise a CPU, the operation of which is controlled by a computer program (software). The computer program can be stored separately from the device on a storage medium from which it can be loaded into the device, in particular into the control unit.

Moreover, for generating a gas flow over the build area, the laser sintering device 1 optionally includes a flow device 30 having a gas supply 31 and a gas outlet 32.

In operation, the support 10 is lowered layer by layer by the control unit 29, the recoater 16 is controlled such that a new powder layer is applied and the deflection device 23 and as the case may be also the laser 21 and/or the focusing device 24 are controlled such that for a solidification of the respective layer at the positions corresponding to the respective object by scanning these positions with the laser.

In laser sintering or laser melting, an exposure device may for example comprise one or more gas or solid-state lasers or any other laser types such as laser diodes, in particular VCSEL (Vertical Cavity Surface Emitting Laser) or VECSEL (Vertical External Cavity Surface Emitting Laser) or a line of these lasers. Therefore, the specific setup of a laser sintering device or laser melting device shown in FIG. 1 is only exemplary for the present invention and may of course be modified, in particular when using a different illumination device than the one that is shown.

Accordingly, all statements made further down do not only apply to laser sintering apparatus or laser melting apparatus but also to layer-wise additive manufacturing apparatus of other types.

Different materials can be used as building material in a layer-wise additive manufacturing method, preferably powders or pastes and gels, respectively, in particular metal powders but also plastic powders, ceramic powders or sand, wherein also the use of filled or mixed powders is possible. In particular in stereolithography, (liquid) photopolymers are used.

In the layer-wise additive manufacturing apparatus that was just described by way of example, a manufacturing process proceeds such that the control unit 29 processes a control dataset (often also designated as "control command set"). In the following, the approach will be exemplarily described with reference to the figures.

Figure 7:
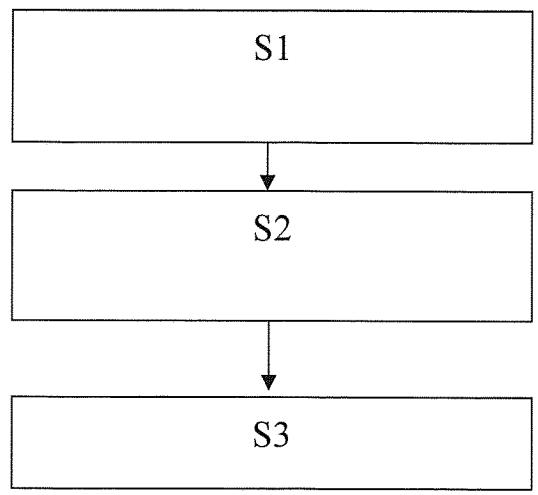
FIG. 7 illustrates the process of a method of providing control data.
Figure 8:
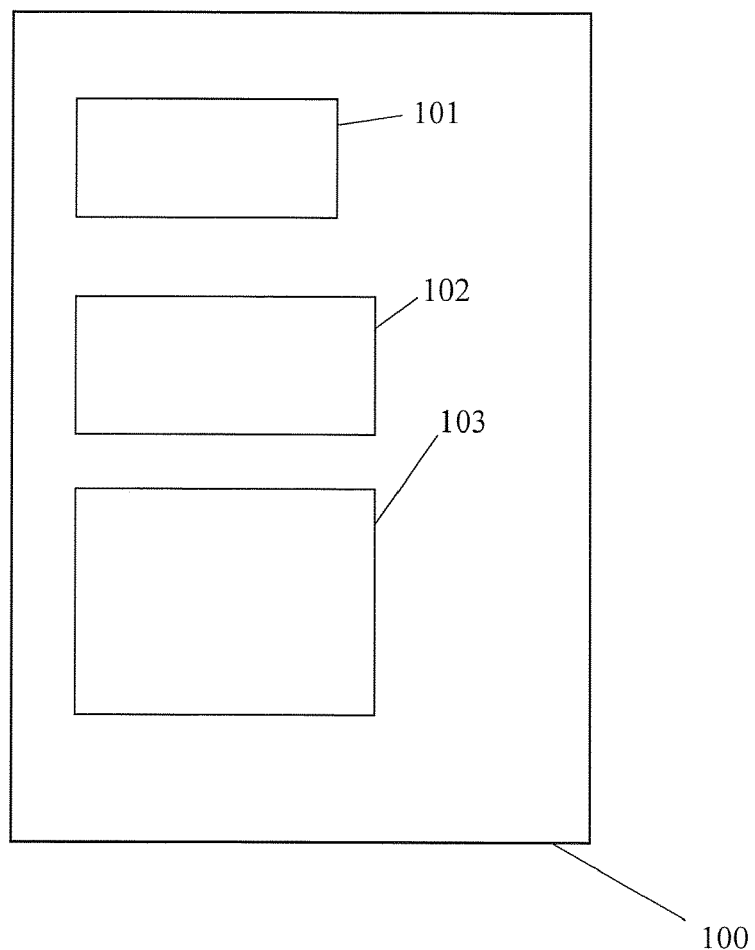
FIG. 8 shows the schematic setup of a device for providing control data.

As shown in FIG. 8, a device 100 for providing control data for a layer-wise additive manufacturing apparatus contains an access unit 101, a specification unit 102 and a provision unit 103. The operating mode of the device 100 for providing control data will be described by making reference to FIG. 7. The other figures will serve for a further illustration.

In the device 100 for providing control data for a layer-wise additive manufacturing apparatus shown in FIG. 8, at first the access unit 101 accesses a plurality of layer datasets of the object to be manufactured. In the process sequence shown in FIG. 7 this is step S1.

Figure 2:
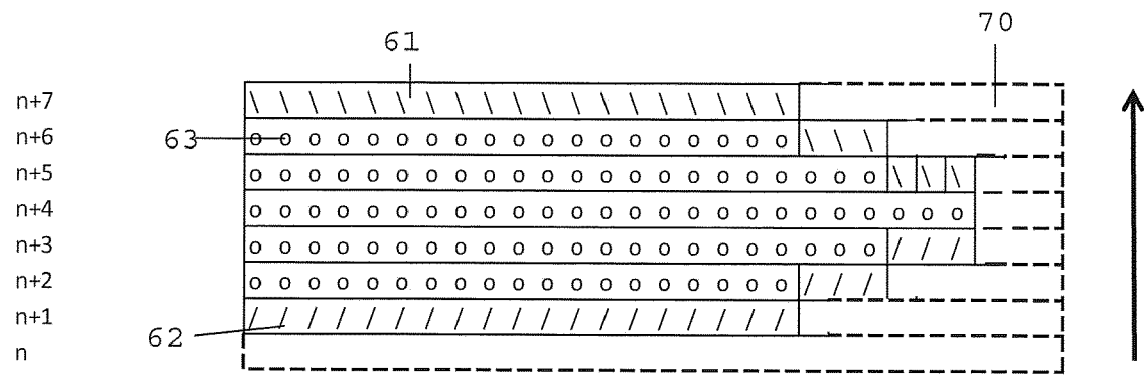
FIG. 2 schematically shows a cross-section of a portion of an object during its manufacture in order to illustrate the different regions of an object cross-section.

For the present invention it is assumed that a layer dataset already contains information, whether regions in the building material layer assigned to the layer dataset are located above or below of building material that is to remain unsolidified. This is explained in the following based on FIG. 2. FIG. 2 shows a side view of an object cross-section manufactured by a layer-wise additive manufacturing method similar to the side view of the object 2 in FIG. 1. The object portion shown in FIG. 2 has seven cross-sections in layers n+1 to n+7, wherein the arrow at the right side in the figure indicates the direction in which the object portion is built layer upon layer ("z direction" when the build volume is transferred to a coordinate system). In all layers each region 70, inside of which the building material remains unsolidified, is represented without filling and with a dashed borderline.

Furthermore, one can recognize in FIG. 2 so-called bottom surface regions 62 (in technical jargon often designated also as "downskin regions"). These are regions of an object cross-section which during the manufacture of the object lie above of building material that remains unsolidified. Thus, the bottom surface regions 62 correspond to surface regions of the object that are facing downwards (to the support 10) during its manufacture. The bottom surface regions 62 are marked in FIG. 2 by slashes "/".

FIG. 2 also shows regions 61 marked by back-slashes "\". These are regions of an object cross-section which immediately after the manufacture of the object are covered by building material that remained unsolidified. Accordingly, the regions 61 are designated as top surface regions (in technical jargon often also designated as "upskin regions") as they are surface regions of the object to be manufactured that are facing upwards (away from the support 10) during its manufacture. Finally, FIG. 2 shows a region 63 marked with circles "○". These are regions of an object cross-section above and below of which the building material is to be solidified. Therefore, the regions 63 are designated as sandwich regions.

By designating different regions 61, 62, 63 in a layer dataset, it is possible to proceed in the manufacture, in particular the solidification, for all positions in a region in substantially the same way. For example, energy input parameters such as the energy density of the radiation or the medium diameter of the beam when impinging on the building material can be specified uniformly for a region. For example, it is possible to uniformly specify for bottom surface regions an energy input, which is lower as compared to the sandwich regions.

It shall be mentioned that FIG. 2 does not explicitly show contour regions of an object cross-section, in particular the contour of an object cross-section that normally is to be solidified by moving a beam along the edge of an object cross-section. These contour regions of an object cross-section may also be constituents of a bottom surface region, a top surface region or a sandwich region. However, the present invention only refers to non-contour regions.

If the plurality of layer datasets, which is accessed by the access unit 101, does not contain any information, whether regions in the building material layers respectively assigned to the layer datasets lie above or below of building material that is to remain unsolidified, this information can be added to the layer datasets before carrying out the method. For example, this can be done by the device 100 itself.

In a step S2 shown in FIG. 7, the layer dataset modification unit 102 modifies a layer dataset such that a temporal sequence for the scanning of the respective object cross-section with energy radiation is specified. This will be explained further based on FIG. 3, which shows a top view of an exemplary object cross-section and thus a "x-/y-direction" or a horizontal plane when the build volume is transferred to a coordinate system. It may show for example a top view of layer n+2 of FIG. 2 before the application of the building material of layer n+3.

Figure 3:
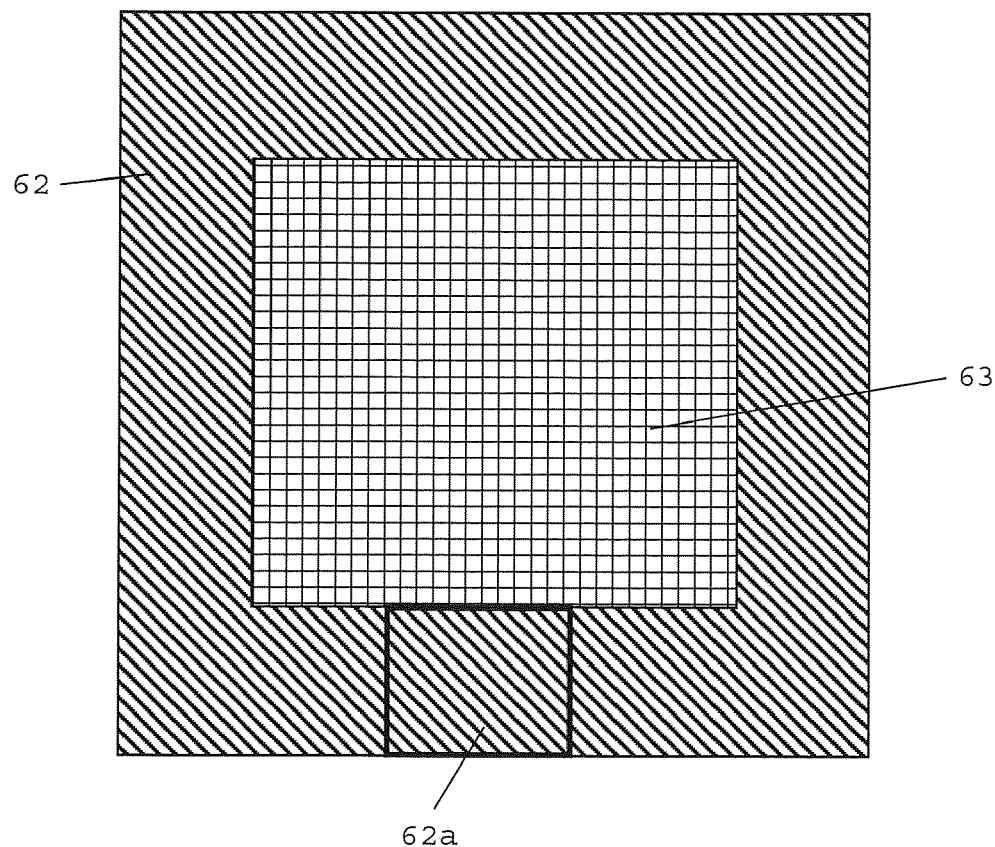
FIG. 3 shows a schematic top view of an exemplary object cross-section for illustrating the approach.

The object cross-section of FIG. 3, which is quadratic only by way of example, consists of a bottom surface region 62 and a sandwich region 63. The layer dataset modification unit 102 specifies in the layer dataset which contains a data model of the object cross-section shown in FIG. 3 that the portion 62*a* of the bottom surface region 62 has to be solidified earlier in time than the sandwich region 63. A reason for the temporal preference of the portion 62*a* may be that the bottom surface in the portion 62*a* has to be solidified particularly evenly, e.g. as the object when it is used must lie evenly at this position or because it must have there a particularly smooth surface. Here, by the prioritization of the portion 62*a* it is achieved that contaminants that may occur when the sandwich region 63 is solidified, cannot get into the region of the portion 62*a* and lead there to a non-uniform solidification. Moreover, process gases (smoke, etc.) developing during the solidification process of the sandwich region 63 can deposit in the portion 62*a* and lead there to inhomogeneities only to a small extent, if this portion is solidified before the sandwich region 63 (and preferably also before the other portions of the bottom surface region 62). As in general there is a tendency of the surfaces of a bottom surface region to show more inhomogeneities, in a further development of the invention the entire bottom surface region of an object cross-section is solidified before the sandwich region, preferably in all building material layers containing a bottom surface region.

If there exist top surface regions 61 in the data model of a building material layer, these may be treated in analogy to the bottom surface regions. FIG. 3 is applicable to this case, if the bottom surface region 62 is replaced by a top surface region 61 and the portion 62*a* is replaced by a portion 61*a* of a top surface region. Thus, also in the case of top surface regions it is specified that the portion 61*a* of the top surface region 62 and even the whole top surface region are to be solidified earlier in time than the sandwich region 63. If in the data model of a building material layer there are bottom surface regions as well as top surface regions, whether at first the portion 61*a* or the portion 62*a* has to be solidified depends on whether a higher homogeneity and/or precision is necessary in the portion 61*a* of the top surface region or in the portion 62*a* of the bottom surface region. According to experience, portions of bottom surface regions should be solidified earlier in time than portions of top surface regions.

In a step S3 shown in FIG. 7, the layer dataset modified in step S2 is finally provided for the generation of a control dataset by the layer dataset provision unit 103.

In the following, modifications of the just described approach will be described. Even if in the following these modifications are described at the example of bottom surface regions, they are in the same way also applicable to top surface regions.

The temporal prioritization for a solidification of portions of bottom surface regions and/or top surface regions is particularly advantageous when the optional flow device that was already mentioned further above is used in the layer-wise additive manufacturing apparatus. By means of this flow device a gas stream is generated over the construction field 8, by which gas stream smoke and vapors that develop during the impinging of a beam onto the building material shall be removed. Here, it is assumed in the following that by the gas supply 31 and the gas outlet 32*a* main flow direction RG with which the gas flows over the construction field is defined, even if this does not mandatorily need to be so.

When a gas stream exists over the construction field 8, then smoke and vapors that develop in the solidification of the building material will mainly move in the main flow direction RG. In a further development of the invention this is taken into account when specifying the temporal sequence for the solidification of a building material layer, as illustrated in FIG. 4.

Figure 4:
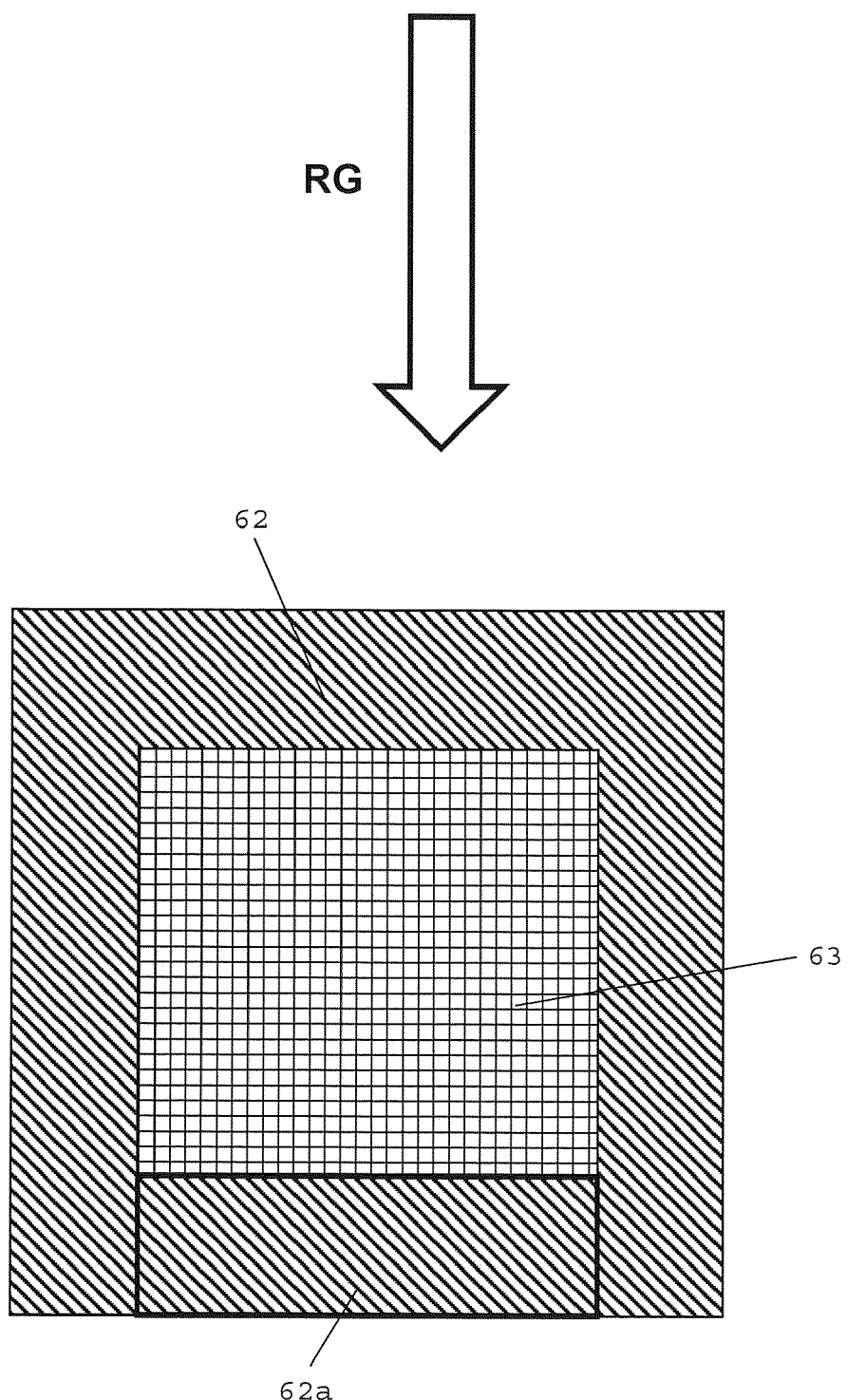
FIG. 4 shows a schematic top view of an exemplary object cross-section for illustrating the approach when there is a gas flow over the construction field.

FIG. 4, which shows a top view of an exemplary object cross-section similar to FIG. 3, also shows the main flow direction RG which is illustrated by an arrow pointing downwards. When specifying the temporal sequence in step S2, this is taken into account such that the portion 62a of the bottom surface region 62 which is to be solidified earlier in time than the sandwich region 63, is chosen such that it includes all positions of the bottom surface region that are lying downstream with respect to the sandwich region 63 based on the main flow direction RG as shown in FIG. 4.

In a further development of the just described variant it is taken into account that smoke and vapors that develop in the solidification of the building material do not only move in the main flow direction RG. This is illustrated in FIG. 5. It shows an exemplary position of a layer of the building material at which the same is to be solidified. Smoke and vapors may get to the position P not only in the main flow direction RG but also from directions within an angular range a around the direction the gas flow is coming from (the direction opposed to the main flow direction RG).

Figure 6:
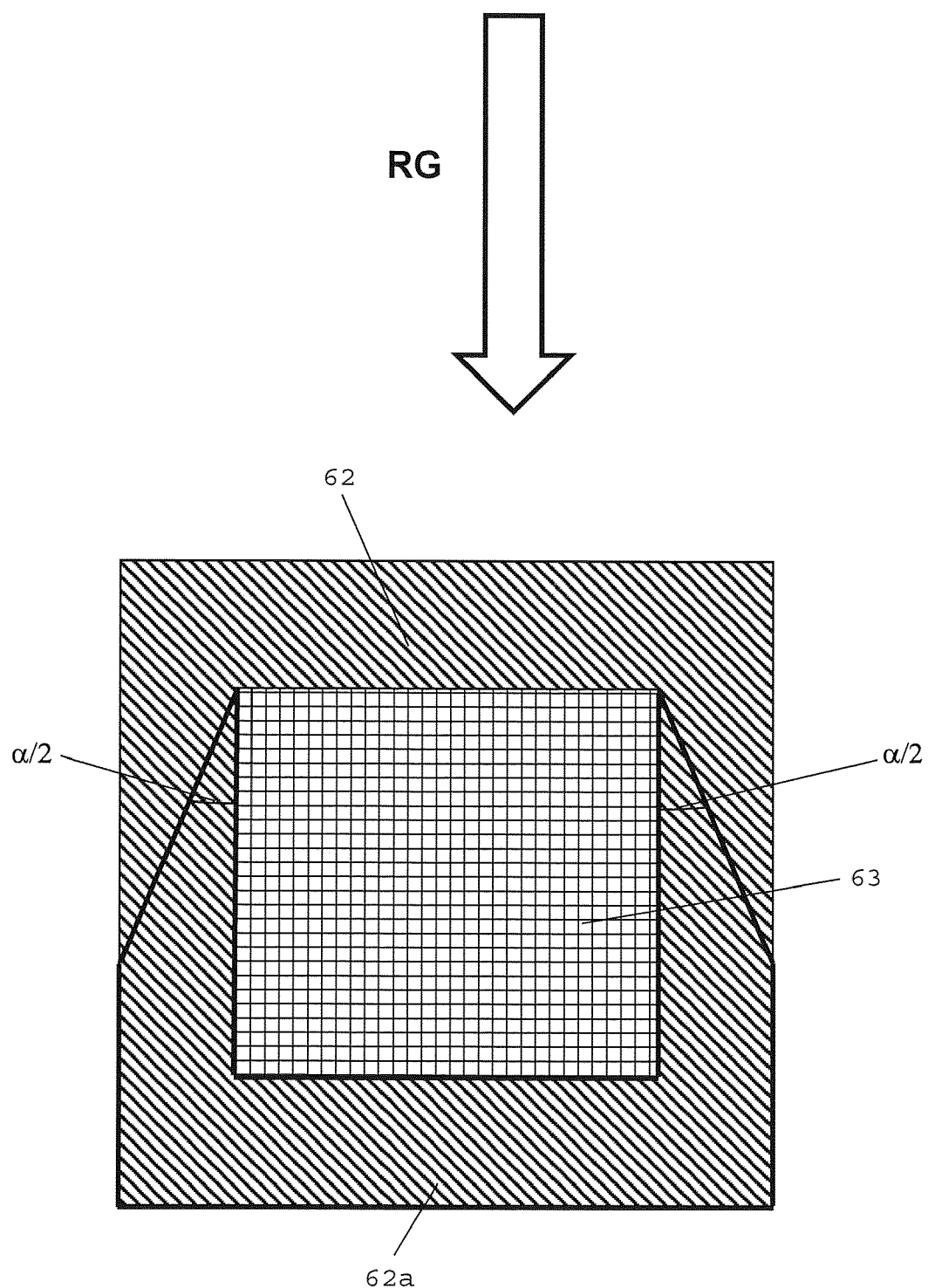
FIG. 6 shows a schematic top view of an exemplary object cross-section for illustrating the variant of the approach when there is a gas flow over the construction field.

As illustrated in FIG. 6, when the variant is developed further and the temporal sequence is specified in step S2, it is correspondingly taken into account that the portion 62a of the bottom surface region 62 which is to be solidified earlier in time than the sandwich region 63, is chosen such that it includes all positions of the bottom surface region for which there exist positions of the object cross-section lying outside of the bottom surface region 62 (meaning in the sandwich region) that are located upstream within a predetermined angular range a around the direction the gas flow is coming from. It can be seen in particular that the borderline limiting the portion 62a away from the main flow direction RG is at an angle $\alpha/2$ to the main flow direction RG at the left and at the right of the sandwich region 63.

The angular range is specified depending on the type of powder that is used, the amount of energy to be input by the beam(s) into the building material, the flow velocity of the gas and other operating parameters of the apparatus. The inventors have found that in general acceptable results for the quality of an object that is obtained may be achieved when a range between $-22.5°$ and $+22.5°$ around the direction the gas flow is coming from is specified as angular range ($\alpha/2=22.5°$). When the angular range increases, the danger of inhomogeneities in the bottom surface region/top surface region decreases, so that e.g. the danger of inhomogeneities is smaller when a range between $-90°$ and $+90°$ around the direction the gas flow is coming from or even a range between $-112.5°$ and $+112.5°$ is specified.

Of course, smoke and vapors may get into a portion 62a of a bottom surface region 62 that is to be solidified before the sandwich region 63 also if positions lying outside of the portion 62a of the bottom surface region 62 are scanned with a beam. Therefore, in step S2 it is preferably specified that the portion 62a is to be solidified not only before the sandwich region 63, but also before all other positions of the bottom surface region 62. This is applicable irrespective of the fact whether a gas flow is directed over the construction field 8.

Figure 9:
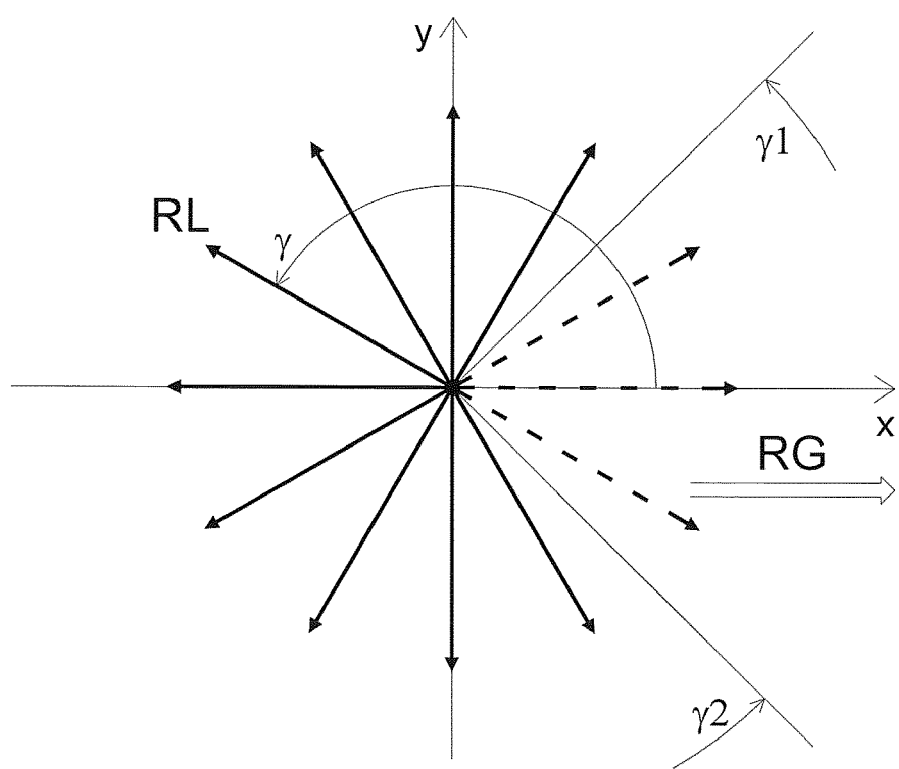
FIG. 9 schematically illustrates the orientation of the direction of movement of a beam with respect to the main flow direction of the gas flow.

Furthermore, the uniformity of the solidification of the building material in a bottom surface region or top surface region (and of course also in a sandwich region) can be improved by moving an energy beam across the building material possibly such that vapors and smoke developing when the radiation impinges on the building material do not get to those positions that are to be solidified next. For an illustration, FIG. 9 shows a top view of the construction field 8 together with a coordinate system. The main flow direction RG of the gas flow is the positive x direction. Furthermore, different scanning directions RL, thus directions of movement, in which a beam is moved across the building material, are shown. Each of these scanning directions RL is at an angle $\gamma$, which may be from 0 to 360° ($0°\leq\gamma\leq360°$) in the mathematically positive sense to the positive x axis, thus to the main flow direction RG. Very good results with respect to the homogeneity of the solidified building material can be achieved when the scanning direction RL and the main flow direction RG as seen in a top view of the working plane form an angle $\gamma$ that lies between 90° and 270° ($90°\leq\gamma\leq270°$). In this case, the vector of movement of the beam in the scanning direction RL has no component pointing in the main flow direction RG.

But also for angles $\gamma$ smaller than 90° or larger than 270°, for which the vector of movement of the beam has a component pointing in the main flow direction RG, a good homogeneity can still be obtained as long as the component perpendicular to the scanning direction RL is large enough for keeping away smoke and vapors from the positions to be scanned next. The preferred operating range (scan vectors or scanlines in FIG. 3 shown continuously) lies between the two limit angles $\gamma1$ and $\gamma2$ ($\gamma1\leq\gamma\leq\gamma2$). Scanning directions RL between 0° and $\gamma1$ or between $\gamma2$ and 360° (exemplary disadvantageous scanning directions are represented as dashed lines in FIG. 9) should be avoided. The limit angles depend on the type of powder that is used, the laser powers that are employed, the flow velocity of the gas that is set and other operating parameters of the apparatus. In general, a sufficient improvement of the object homogeneity can be obtained if the angle $\gamma$ between the scanning direction RL and the main flow direction RG in a top view of the construction field 8 lies between 22.5° and 337.5° ($22.5°\leq\gamma\leq337.5°$). Preferably, a range is selected that is between 45° and 315° ($45°\leq\gamma\leq315°$), further preferably between 60° and 300° ($60°\leq\gamma\leq300°$), still further preferably between 90° and 270° ($90°\leq\gamma\leq270°$). FIG. 9 shows as example a case in which the limit angles $\gamma1$ and $\gamma2$ are set to be $\gamma1=45°$ and $\gamma2=315°$.

The approaches described up to now in the context of the invention can be applied irrespective of the fact with which movement pattern a beam is moved across the building material layer for a scanning of the same. However, particular advantages may result when the movement pattern is additionally taken into account. In the following, this will be explained based on FIGS. 10 and 11.

Here, exposure areas are assigned to a portion to be solidified of an object cross-section. The portion as it were is divided into exposure areas that usually are rectangular or square-shaped. In each of these exposure areas the building material is solidified by scanning with one or more beams that preferably are moved in scanlines that are in parallel to each other. The approach for such an area-wise solidification is shown exemplarily in FIGS. 10a and 10b.

FIGS. 10a and 10b show a top view of the construction field with two different variants for the scanning of a (in the example rectangular) exposure area S. In both variants a beam is moved across the building material layer within the exposure area S in scanlines (in technical jargon also named "hatches") V that are in parallel to one another, wherein the scanlines are substantially perpendicular to the longitudinal extension of the exposure areas. When the building material is solidified in an exposure area S, an advance of the region solidified by the beam in an advance direction RV results, which advance direction in the example is perpendicular to the scanlines and is the direction in which the scanlines V are irradiated one after the other.

In FIG. 10a, the scanning directions RL in which two neighboring scanlines V are scanned with the beam are opposed to each other. The turning zones in the movement of the beam are shown as dashed lines in FIG. 10a and lie outside of the exposure area S. The beam is switched off in the turning zones or masked and/or at these positions the beam scans with an increased velocity that is so high or with an energy density that is so low that the energy input by the beam is not sufficient for solidifying the building material.

In FIG. 10b, the scanning directions RL in which two neighboring scanlines V are scanned with the beam are the same. After the inversion of the direction of movement the beam remains switched off until it has reached again the exit side of the exposure area. Again, the switching off of the beam during the movement is indicated by a dashed line.

The inventors have realized that an area-wise scanning of the bottom surface regions and top surface regions is advantageous for an improved object quality. The inventors have the view that this is due to the fact that an exposure area that is e.g. rectangular or square-shaped, can be scanned with scanlines that are in parallel and have the same length. When no exposure areas are implemented, the lengths of the scanlines may be very different which may lead locally to an energy input that is too high or too low and thus to a non-uniform solidification.

If exposure areas are assigned to a bottom surface region or top surface region (and of course also to a sandwich region), an additional improvement of the object quality (e.g. the homogeneity) can be achieved, when a flow device 30 is used in the layer-wise additive manufacturing apparatus and the advance direction RV in which the solidification of the building material advances within an exposure area is coordinated with the main flow direction RG. This will be explained in the following based on FIG. 11.

Figure 11:
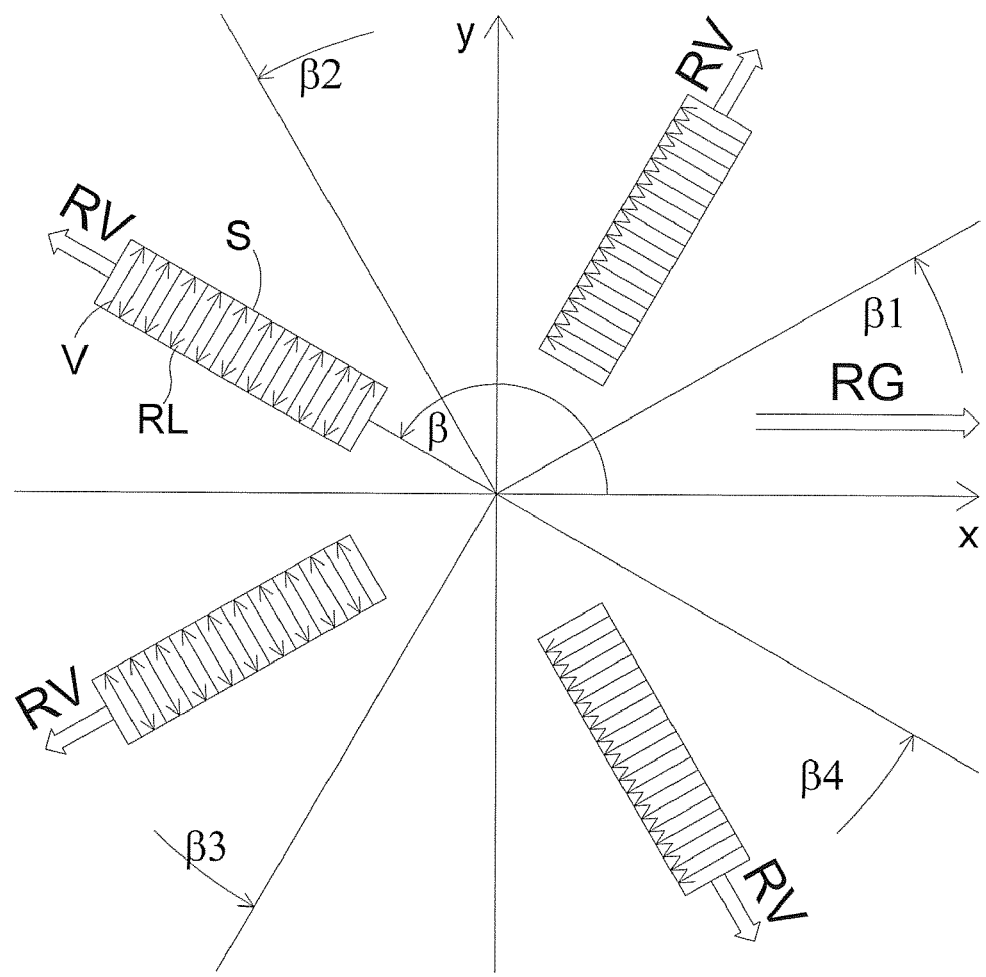
FIG. 11 illustrates the orientation of the advance direction of the scanlines inside of an exposure area with respect to the main flow direction of the gas flow.

Similar to FIG. 9, FIG. 11 is a schematic top view of the construction field 8. As in FIG. 11, the main flow direction RG of the gas flow points in the positive x direction of the coordinate system. Furthermore, by way of example for each of different advance directions RV a single exposure area S is shown with the scanlines V therein. Each of the advance directions RV forms an angle $\beta$ with the positive x-axis thus with the main flow direction RG in the mathematical positive sense, which angle can range from 0 to 360° ($0° \leq \beta \leq 360°$). In this case, there are four limit angles which satisfy the relation $\beta1 < \beta2 < \beta3 < \beta4$, wherein the ranges between 0° and $\beta1$ and between $\beta4$ and 360° shall be avoided. If neighboring scanlines are always scanned opposite to one another (see FIG. 10a) the range between the two limit angles $\beta2$ and $\beta3$ ($\beta2 \leq \beta \leq \beta3$) should be chosen for the angle $\beta$, in particular a range between $\beta2 = 112.5°$ and $\beta3 = 247.5°$ ($112.5° \leq \beta \leq 247.5°$), preferably between $\beta2 = 135°$ and $\beta3 = 225°$ ($135° \leq \beta \leq 225°$), further preferably between $\beta2 = 150°$ and $\beta3 = 210°$ ($150° \leq \beta \leq 210°$), so that the angle $\gamma$ (see FIG. 9) between the scanning directions RL of the scanlines V and the main flow direction RG always is able to comply with the ranges specified further above in connection with FIG. 9.

If neighboring scanlines always point in the same direction (see FIG. 10b) and their scanning directions RL and the main flow direction are at an angle that is larger than or equal to 90°, the two ranges between the limit angles $\beta1$ and $\beta2$ ($\beta1 \leq \beta \leq \beta2$) and between the limit angles $\beta3$ and $\beta4$ ($\beta3 \leq \beta \leq \beta4$) are also well suited. Preferably, the value of the limit angle $\beta1$ should be set to 22.5°, more preferably to 45° and even more preferably to 60°. Preferably, the value of the limit angle $\beta4$ should be set to 337.5°, more preferably to 315° and even more preferably to 300°.

Finally, it shall be mentioned that a device for providing control data for a layer-wise additive manufacturing apparatus can be implemented not exclusively by software components but also exclusively by hardware components or mixtures from hardware and software. In particular, interfaces that are mentioned in the present application need not necessarily be configured to be hardware components, but can also be implemented as software modules, for example when the data that are input or output via the same can be taken over from other components that are implemented in the same device or need to be transferred to another component only by software. Also, the interfaces could consist of hardware components and software components, such as a standard hardware interface that is specifically configured by software for a specific application. Furthermore, a plurality of interfaces can be combined into a common interface such as an input-output interface.

The invention claimed is:

1. A computer-based method of providing control data for a layer-wise additive manufacturing apparatus for manufacturing an object, wherein in the layer-wise additive manufacturing apparatus the object is manufactured by a layer-wise application of a building material onto a support or a previously applied layer of the building material and by a solidification of the building material by a supply of radiation to positions in a layer that correspond to a horizontal cross-section of the object in the layer in that these positions are scanned with energetic radiation by an energy input unit such that the energy input unit directs at least one energy beam to predetermined positions of a layer of the building material so that a solidification of the building material is effected by the energy beam, wherein the method of providing control data comprises:

a first step of accessing a plurality of layer datasets comprising data models of a plurality of building material layers to be selectively solidified during the manufacture and lying immediately one over the other, wherein each layer dataset comprises a data model in which positions corresponding to an object cross-section are marked, a solidification of the building material in the respective layer occurring at the positions, and wherein in at least one layer dataset a bottom surface region of an object cross-section exists in the corresponding data model, wherein the bottom surface region is defined such that in at least one of p layers below the bottom surface region no solidification of building material is specified, wherein p is a predefined natural number, and/or a top surface region of an object cross-section exists wherein the top surface region is defined such that in at least one of q layers above the top surface region no solidification of building material is specified, wherein q is a predefined natural number;

a second step of modifying the at least one layer dataset such that a temporal sequence for the scanning of the respective object cross-section with energetic radiation is specified such that at least one portion of the bottom surface region, or at least one portion of the top surface region, is scanned and solidified before all other positions to be solidified of the object cross-section in the respective object cross-section, where the at least one portion of the bottom surface region and the at least one portion of the top surface region are less than the respective cross-section; and a third step of providing the at least one layer dataset that has been modified in the second step for the generation of a control dataset for the layer-wise additive manufacturing apparatus.

2. A method for generating a control dataset for controlling a layer-wise additive manufacturing method for manufacturing an object, wherein the object is manufactured by a layer-wise application of a building material onto a support or a previously applied layer of the building material and by a solidification of the building material by a supply of radiation to positions in a layer that correspond to the cross-section of the object in the layer in that the positions are scanned with energetic radiation by an energy input unit that directs at least one energy beam to predetermined positions of the layer of the building material so that the solidification of the building material is effected by the energy beam, the method comprising:
- a first step of accessing a plurality of layer datasets comprising data models of a plurality of layers of the building material to be selectively solidified during the manufacture and wherein the layers of the building material lie immediately one over the other, wherein each layer dataset comprises a data model in which positions corresponding to an object cross-section are marked, wherein a solidification of the building material in the respective layer occurs at the positions, and wherein in at least one layer dataset a bottom surface region of an object cross-section exists in the corresponding data model in which the bottom surface region is defined such that in at least one of p layers below the bottom surface region no solidification of building material is specified, wherein p is a predefined natural number, and/or a top surface region of an object cross-section exists in which the top surface region is defined such that in at least one of q layers above the top surface region no solidification of building material is specified, wherein q is a predefined natural number;
- a second step of modifying the at least one layer dataset such that a temporal sequence for the scanning of the respective object cross-section with energetic radiation is specified such that at least one portion of the bottom surface region or at least one portion of the top surface region is scanned and solidified before all other positions to be solidified of the object cross-section in the respective object cross-section, where said at least one portion of the bottom surface region and the at least one portion of the top surface region are less than the respective cross-section; and
- a third step of providing the at least one layer dataset that has been modified in the second step for the generation of the control dataset for the layer-wise additive manufacturing apparatus.

3. The layer-wise additive manufacturing method of claim 2, further comprising:
- assigning exposure areas to the at least one portion of the bottom surface region, and/or to the at least one portion of the top surface region; and
- specifying a scanning of the building material with at least one energy beam in scanlines that are in parallel to each other in each exposure area.

4. The layer-wise additive manufacturing method of claim 3, wherein in case a dimension of a portion across which an energy beam is to be moved is so small and/or a velocity of movement of an energy beam across the building material is so large that in the scanning along a first scanline a predetermined minimum length of time is underrun, a waiting time after the scanning of the first scanline is specified before the energy beam is moved along a second scanline and/or a radiation energy input per unit area along the first scanline and/or the second scanline is lowered.

5. The layer-wise additive manufacturing method of claim 4, wherein a value smaller than 25 is specified for p and/or q.

6. The method for generating a control dataset of claim 2, further comprising:
- directing a gas flow over the respective position of incidence of an energy beam; and
- controlling the process of the layer-wise additive manufacturing method by the control dataset by specifying that the object cross-section has positions in the layer outside of the bottom surface region that are located further upstream than positions in the at least one portion of the bottom surface region and/or that the object cross-section has positions in the layer outside of the top surface region that are located further upstream than positions in the at least one portion of the top surface region.

7. The method for generating a control dataset of claim 6, further comprising:
- controlling the process of the layer-wise additive manufacturing method by the control dataset by specifying that the object cross-section has positions in the layer outside of the bottom surface region that are located further upstream within an angular range around the direction the gas flow is coming from than positions in the at least one portion of the bottom surface region and/or that the object cross-section has positions in the layer outside of the top surface region that are located further upstream within an angular range around the direction the gas flow is coming from than positions in the at least one portion of the top surface region.

8. The method for generating a control dataset of claim 7, further comprising specifying as the angular range a range between −22.5° and +22.5° around the direction the gas flow is coming from.

9. The method for generating a control dataset of claim 2, wherein the energy input unit is controlled such that the scanning direction, in which the energy beam is moved over the building material at a solidification position and the direction of the gas flow at the solidification position, are at an angle that is larger than or equal to 22.5° and/or smaller than or equal to 337.5°.

10. The method for generating a control dataset of claim 2, further comprising:
- controlling the energy input unit such that the scanning directions of two neighbouring scanlines are opposed to each other in at least one exposure region,
- wherein an advance direction in which the scanlines in the exposure region are subsequently scanned with the at least one energy beam and the direction of the gas flow averaged over all positions of the at least one exposure region are at an angle that is larger than or equal to 112.5° and/or smaller than or equal to 247.5°.

11. The method for generating a control dataset of claim 2, further comprising:
- controlling the energy input unit such that the scanning directions of all scanlines in an exposure region are the same,
- wherein an advance direction in which the scanlines in the exposure region are subsequently scanned with the at least one energy beam and the direction of the gas flow averaged over all positions of the at least one exposure region are at an angle that is larger than or equal to 22.5° and/or smaller than or equal to 337.5°, and
- the scanning directions and the direction of the gas flow averaged over all positions of the at least one exposure region are at an angle that is larger than or equal to 90°.

12. The layer-wise additive manufacturing method of claim 2 further comprising:
- providing a data access unit configured to access a plurality of layer datasets comprising data models of a plurality of building material layers to be selectively solidified during the manufacture and lying immediately one over the other, wherein each layer dataset comprises a data model in which positions corresponding to an object cross-section are marked, wherein a solidification of the building material in the respective layer occurs at the positions, and wherein in at least one layer dataset a bottom surface region of an object cross-section exists in the corresponding data model, wherein the bottom surface region is defined such that in at least one of p layers below the bottom surface region no solidification of building material is specified, wherein p is a predefined natural number, and/or a top surface region of an object cross-section exists, wherein the top surface region is defined such that in at least one of q layers above the top surface region no solidification of building material is specified, wherein q is a predefined natural number,
- modifying the at least one layer dataset such that a temporal sequence for the scanning of the respective object cross-section with energetic radiation is specified such that at least one portion of the bottom surface region, or at least one portion of the top surface region, is scanned before all other positions to be solidified of the object cross-section; and
- providing at least one layer dataset that has been modified by the layer dataset modification unit for the generation of a control dataset for the layer-wise additive manufacturing apparatus.

13. The method of claim 12, further comprising
a computer-based method of providing control data for a layer-wise additive manufacturing apparatus for manufacturing an object,
wherein in the layer-wise additive manufacturing apparatus the object is manufactured by a layer-wise application of a building material onto a support or a previously applied layer of the building material and by a solidification of the building material by a supply of radiation to positions in a layer that correspond to the cross-section of the object in this layer in that the positions are scanned with energetic radiation by an energy input unit such that the energy input unit directs at least one energy beam to predetermined positions of a layer of the building material so that a solidification of the building material is effected by the energy beam,
wherein the method of providing control data comprises:
- a first step of accessing a plurality of layer datasets comprising data models of a plurality of building material layers to be selectively solidified during the manufacture and lying immediately one over the other, wherein each layer dataset comprises a data model in which positions corresponding to an object cross-section are marked, wherein a solidification of the building material in the respective layer occurs at the positions, and wherein in at least one layer dataset a bottom surface region of an object cross-section exists in the corresponding data model, wherein the bottom surface region is defined such that in at least one of p layers below the bottom surface region no solidification of building material is specified, wherein p is a predefined natural number, and/or a top surface region of an object cross-section exists, wherein the top surface region is defined such that in at least one of q layers above the top surface region no solidification of building material is specified, wherein q is a predefined natural number,
- a second step of modifying the at least one layer dataset such that a temporal sequence for the scanning of the respective object cross-section with energetic radiation is specified such that at least one portion of the bottom surface region, or at least one portion of the top surface region, is scanned before all other positions to be solidified of the object cross-section; and
- a third step of providing the at least one layer dataset that has been modified in the second step for the generation of a control dataset for the layer-wise additive manufacturing apparatus.

14. A method for controlling a layer-wise additive manufacturing process for manufacturing an object, wherein the object is manufactured by a layer-wise application of a building material and by a solidification of the building material by a supply of radiation to positions in a respective horizontal layer that correspond to a respective cross-section of the object, comprising:
- providing an energy input unit that directs at least one energy beam to predetermined positions of the layer of the building material so that the solidification of the building material is effected by the energy beam;
- providing a plurality of layer datasets comprising data models of layers of the building material to be selectively solidified during the manufacture and wherein the layers of the building material lie immediately one over the other, the object having certain layers which form an interior region area of solidified material in a finished object where the certain layers in the interior region area are stacked one upon, the object further having perimeter portions of a respective cross-section which are outboard from the interior region area and when solidified have unsolidified powder material above or below the perimeter portions, respective perimeter portions constituting less than a respective cross-section of a layer; and
- solidifying a respective perimeter portion in a layer as a whole before solidifying of a remainder of the cross-section constituting the interior region area for a layer.

15. The method of claim 14, wherein the interior region area is a sandwich region of stacked layers in the finished object, the perimeter portions with unsolidified material below are downskin regions, and the perimeter portions with unsolidified material above are upskin regions.

16. The method of claim 14, wherein the unsolidified powder material is immediately above or below the perimeter portions.

* * * * *